United States Patent
Morarity et al.

(10) Patent No.: US 11,402,476 B2
(45) Date of Patent: Aug. 2, 2022

(54) METHOD AND APPARATUS FOR LIDAR CHANNEL ENCODING

(71) Applicant: Microvision, Inc., Redmond, WA (US)

(72) Inventors: Jonathan A. Morarity, Seattle, WA (US); Christopher Brian Adkins, Woodinville, WA (US)

(73) Assignee: Microvision, Inc., Redmond, WA (US)

(*) Notice: Subject to any disclaimer, the term of this patent is extended or adjusted under 35 U.S.C. 154(b) by 787 days.

(21) Appl. No.: 16/358,695

(22) Filed: Mar. 20, 2019

(65) Prior Publication Data

US 2020/0300983 A1 Sep. 24, 2020

(51) Int. Cl.
*G01S 7/00* (2006.01)
*G01S 7/4861* (2020.01)
*G01S 7/4865* (2020.01)
*G01S 7/487* (2006.01)
*G01S 17/26* (2020.01)

(52) U.S. Cl.
CPC ............ *G01S 7/4861* (2013.01); *G01S 7/487* (2013.01); *G01S 7/4865* (2013.01); *G01S 17/26* (2020.01)

(58) Field of Classification Search
USPC .............................................. 356/4.01, 5.01
See application file for complete search history.

(56) References Cited

U.S. PATENT DOCUMENTS

| | | | |
|---|---|---|---|
| 10,006,766 B2 * | 6/2018 | Hinderling | G01S 17/42 |
| 10,338,220 B1 * | 7/2019 | Raring | G01S 7/487 |
| 2016/0084651 A1 * | 3/2016 | Hinderling | G01S 17/10 356/4.01 |
| 2017/0045613 A1 * | 2/2017 | Wang | G01S 13/343 |
| 2017/0343652 A1 * | 11/2017 | de Mersseman | G01S 7/484 |
| 2018/0059215 A1 * | 3/2018 | Turbiner | G01S 15/931 |
| 2018/0259339 A1 * | 9/2018 | Johnson | G05D 1/0692 |
| 2019/0064340 A1 * | 2/2019 | Kim | G01S 13/325 |
| 2019/0086517 A1 * | 3/2019 | Puglia | G01S 7/4802 |
| 2019/0154439 A1 * | 5/2019 | Binder | G01S 13/878 |
| 2019/0179015 A1 * | 6/2019 | Raring | G01S 17/931 |
| 2019/0179016 A1 * | 6/2019 | Raring | G01S 17/10 |
| 2019/0187284 A1 * | 6/2019 | Raring | H01S 5/34333 |

* cited by examiner

Primary Examiner — James R Hulka
(74) Attorney, Agent, or Firm — Kevin D. Wills

(57) ABSTRACT

A light detection and ranging system modulates laser light pulses with a channel signature to encode transmitted pulses with channel information. The modulated laser light pulses may be scanned into a field of view. Received reflections not modulated with the same channel signature are rejected. Multiple light pulses of different wavelengths may be similarly or differently modulated.

21 Claims, 12 Drawing Sheets

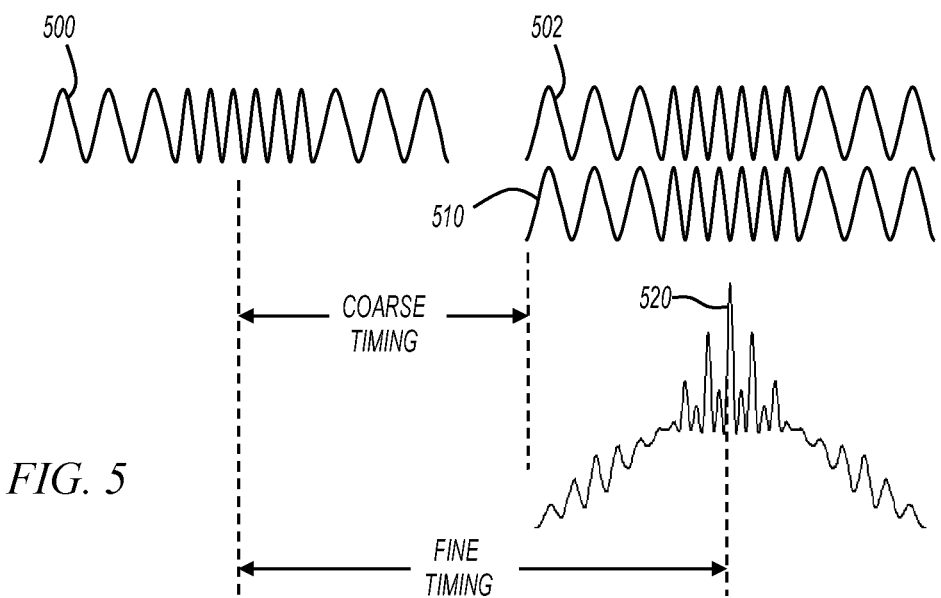
FIG. 5
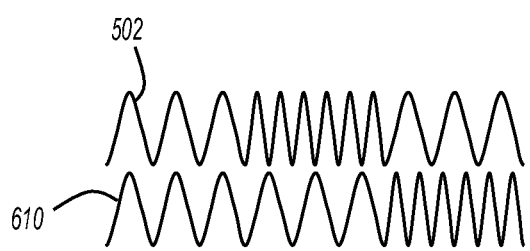
FIG. 6
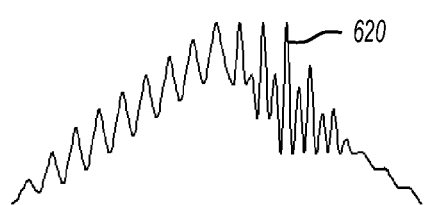

METHOD AND APPARATUS FOR LIDAR CHANNEL ENCODING

FIELD

The present invention relates generally to light detection and ranging systems, and more specifically to interference rejection in light detection and ranging systems.

BACKGROUND

Light Detection and Ranging (LIDAR) systems typically transmit laser light pulses, receive reflections, and determine range values based on time-of-flight measurements. Increasing use of LIDAR systems in some environments is leading to interference that results from one LIDAR system receiving pulse reflections that emanate from a different LIDAR system.

BRIEF DESCRIPTION OF THE DRAWINGS

FIG. 5 shows detection of a pulse modulated with a channel signature in accordance with various embodiments of the present invention;

FIG. 6 shows rejection of a pulse modulated with a channel signature in accordance with various embodiments of the present invention;

DESCRIPTION OF EMBODIMENTS

Figure 1:
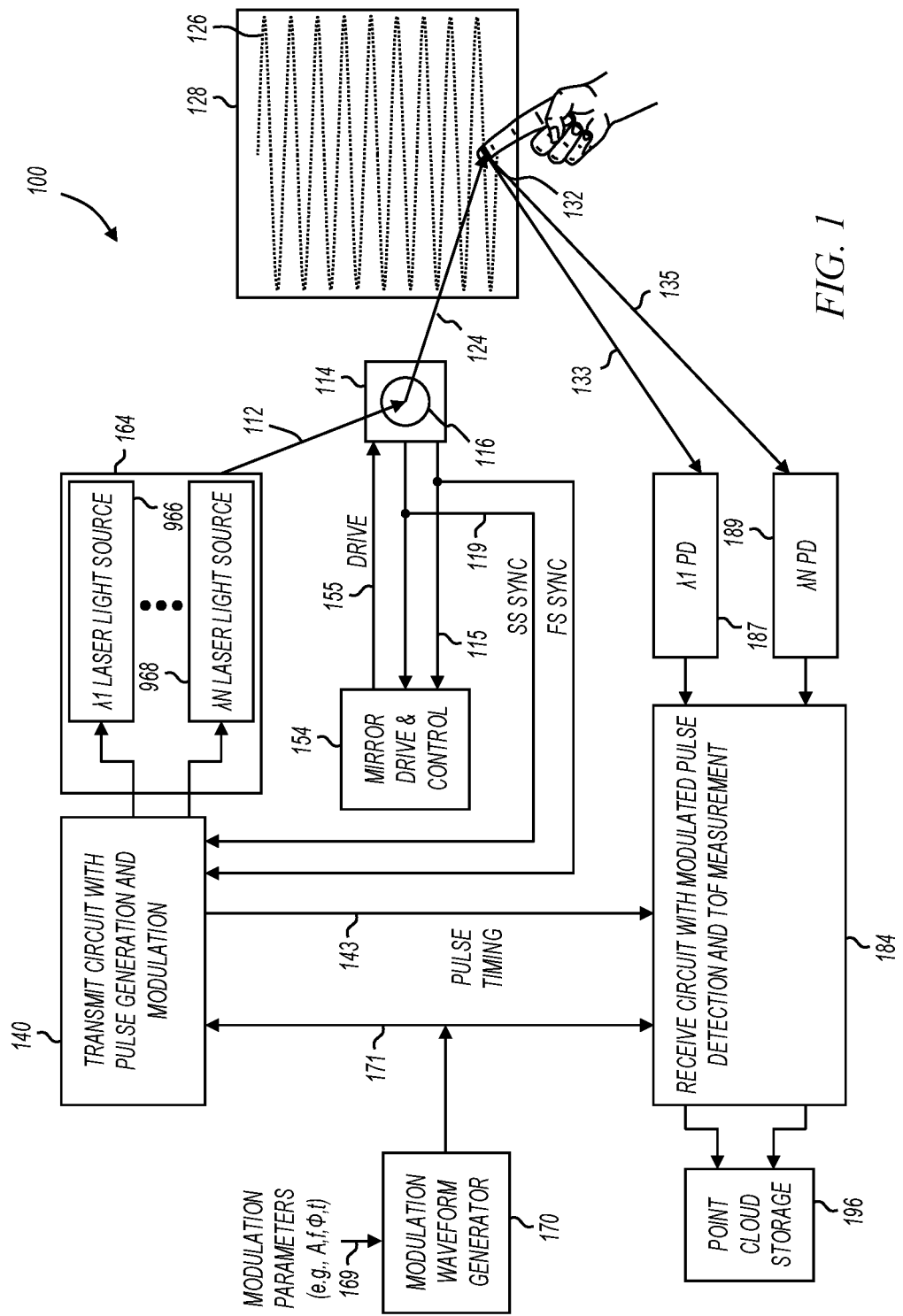
FIG. 1 shows a block diagram of a LIDAR system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a LIDAR system in accordance with various embodiments of the present invention. System 100 includes transmit circuit 140 with pulse generation and modulation, laser light sources 164, scanning platform 114 with scanning mirror 116, and mirror drive and control circuit 154. System 100 also includes modulation waveform generator 170, photodetectors (PD) 187, 189, receive circuit 184 with modulated pulse detection and time-of-flight (TOF) measurement, and point cloud storage 196.

Transmit circuit 140 generates pulses and modulates the pulses with information provided by modulation waveform generator 170 on node 171. The resulting modulated pulses are provided to laser light sources 164. Modulation waveform generator 170 produces modulation waveforms in response to modulation parameters provided on node 169. The modulation parameters on node 169 may include any number or type of parameters that can affect modulation of pulses. For example, the modulation parameters may include amplitude information, frequency information, phase information, time information, or the like. As a result, pulses may be modulated using any type or combination of types of modulation including amplitude modulation, frequency modulation, phase modulation, or the like. In some embodiments, light sources 164 include a single laser light source.

In other embodiments, light sources 164 include multiple light sources capable of emitting laser light of different wavelengths. Light sources 164 shows two light sources, however, any number of light sources at different wavelengths may be included. For example, laser light source 166 emits laser light having a wavelength $\lambda 1$, and laser light source 168 emits laser light having a wavelength $\lambda N$, where N is any number.

In some embodiments, laser light sources 164 produce laser light pulses of a single wavelength, all modulated using a common modulation waveform. For example, transmit circuit 140 may produce a stream of similarly modulated pulses that are used to drive a single laser light source within laser light sources 164. In other embodiments, laser light sources 164 produce laser light pulses of multiple different wavelengths, each being modulated using different modulation waveforms. For example, transmit circuit 140 may produce multiple streams of modulated pulses where each stream is modulated using a different modulation waveform. Each of these streams is then in turn used to drive a different laser light source within laser light sources 164.

Light sources 164 include optics whose purpose is to combine light beam paths such that light from any of light sources 164 travels on the same or similar collimated path shown as modulated laser beam 112. The beam 112 impinges on a scanning platform 114 which is part of a microelectromechanical system (MEMS) based scanner or the like, and reflects off of scanning mirror 116 to generate a controlled output beam 124.

A scanning mirror drive and control circuit 154 provides one or more drive signal(s) 155 to control the angular motion of scanning mirror 116 to cause output beam 124 to generate a raster scan 126 in a field of view 128. In operation, light sources 164 produce modulated laser light pulses at a single wavelength or at multiple different wavelengths, and scanning mirror 116 reflects the modulated laser light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning mirror 116 includes one or more sensors to detect the angular position or angular extents of the mirror deflection (in one or both dimensions). For example, in some embodiments, scanning platform 114 includes a piezoresistive sensor that delivers a voltage that is proportional to the deflection of the mirror on the fast-scan axis. Further, in some embodiments, scanning platform 114 includes an additional piezoresistive sensor that delivers a voltage that is proportional to the deflection of the mirror on the slow-scan axis. The mirror position information is provided back to mirror drive and control circuit 154 as the slow scan (SS) sync signal 119 and the fast scan (FS) sync signal 115. In these embodiments, mirror drive and control circuit 154 includes one or more feedback loops to modify the drive signals in response to the measured angular deflection of the mirror.

The slow scan (SS) sync signal 119 and the fast scan (FS) sync signal 115 are also provided to transmit circuit 140. In response, transmit circuit 140 generates modulated pulses synchronous with the mirror position so that a point cloud may be generated at known points in the raster scan (described further below).

Mirror drive and control circuit 154 is implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

In operation, modulated laser light pulses having one or more different wavelengths may be reflected by an object 132 in the field of view 128. One or more photodetectors 187, 189 detect reflections of the modulated laser light pulses 133, 135. For example, PD 187 may detect reflected modulated laser light pulses 133 having wavelength $\lambda 1$, and PD 189 may detect reflected modulated laser light pulses 135 having wavelength $\lambda N$. Photodetectors 187, 189 provide indications of detected light to receive circuit 184.

Receive circuit 184 includes modulated pulse detection and time-of-flight (TOF) measurement circuits. Receive circuit 184 detects whether the received reflections were transmitted by system 100 by determining if the received pulses are modulated in the same fashion as the pulses modulated by pulse generation and modulation circuit 140. For example, receive circuit 184 receives the same modulation waveform information on node 171 that is provided to pulse generation and modulation circuit 140. Receive circuit 184 uses one of many possible techniques to determine if the received reflections of modulated laser light pulses are modulated with the same modulation waveform. For example, in some embodiments, receive circuit 184 correlates the modulation waveform on node 171 with the pulse shape of the received reflections. In other embodiments, receive circuit 184 may demodulate received pulses and compare modulation parameters. The various embodiments of the present invention are not limited by the manner in which the modulation is detected.

Receive circuit 184 receives laser light pulse timing information 143 from pulse generation and modulation circuit 140 and compares it to the timing of received reflections of modulated laser light pulses to measure round trip times-of-flight of light pulses, thereby measuring the distance (Z) to the point in the field of view 128 from which the modulated laser light pulse was reflected.

In some embodiments, receive circuit 184 includes multiple modulation detection and TOF measurement circuits capable of measuring times-of-flight of light pulses of different wavelengths. For example, a first modulation detection circuit may determine if pulses of a first wavelength $\lambda 1$ were transmitted by system 100, and if so, a first TOF measurement circuit measures the TOF of those reflected modulated laser light pulses having a wavelength $\lambda 1$. Similarly, a second modulation detection circuit may determine if pulses of a second wavelength $\lambda N$ were transmitted by system 100, and if so, a second TOF measurement circuit measures the TOF of those reflected modulated laser light pulses having a wavelength λN. TOF measurement circuits may be implemented with any suitable circuit elements. For example, in some embodiments, TOF measurement circuits include digital and/or analog timers, integrators, correlators, comparators, registers, adders, or the like to compare the timing of the reflected modulated laser light pulses with the pulse timing information received from pulse generation and modulation circuit 140.

In some embodiments, light sources 164 source nonvisible light such as infrared (IR) light. In these embodiments, photodetectors 187 and 189 are able to detect respective wavelengths of nonvisible light. For example, in some embodiments, light source 166 may include a laser diode that produces infrared light with a wavelength of substantially 850 nanometers (nm), and detector device 187 detects reflected light pulses with a wavelength of substantially 850 nm. Also for example, in some embodiments, light source 168 may include a laser diode that produces infrared light with a wavelength of substantially 900 nanometers (nm), and detector device 189 detects reflected light pulses with a wavelength of substantially 900 nm. The wavelength of light is not a limitation of the present invention. Any wavelength, visible or nonvisible, may be used without departing from the scope of the present invention.

As shown in FIG. 1, the number of wavelengths detected by the photodetectors, N, matches the number of wavelengths sourced by the laser light sources. Any number of light sources, and any number of detector devices and corresponding modulation detection and TOF measurement circuits may be included without departing from the scope of the present invention.

Point cloud storage 196 receives TOF information corresponding to distance (Z) information from receive circuit 184. In some embodiments, the TOF measurements are held in point cloud storage 196 in an array format such that the location within point cloud storage 196 indicates the location within the field of view from which the measurement was taken. In other embodiments, the TOF measurements held in point cloud storage 196 include (X,Y) position information as well as TOF measurement information to yield (X,Y,Z) as a three dimensional (3D) data set that represents a point cloud of the measured portion of the field of view 128. The depth map data may then be used for any suitable purpose. Examples include 3D imaging, gesture recognition, augmented reality, autonomous vehicle management, and the like.

Point cloud storage 196 may be implemented using any suitable circuit structure. For example, in some embodiments, point cloud storage 196 is implemented in a dual port memory device that can be written on one port and read on a second port. In other embodiments, point cloud storage 196 is implemented as data structures in a general purpose memory device. In still further embodiments, point cloud storage 196 is implemented in an application specific integrated circuit (ASIC).

Pulse generation and modulation circuit 140 controls the generation of laser light pulses and causes them to be generated at times that spatially place the pulses in a desired pattern within the field of view. For example, pulse generation and modulation circuit 140 may control the timing of laser light pulses such that laser light pulses of different wavelengths are directed to similar or identical locations within the field of view. Also for example, pulse generation and modulation circuit 140 may control the timing of laser light pulses such that laser light pulses of different wavelengths are interleaved in space. In some embodiments, pulse generation and modulation circuit 140 may control the timing of laser light pulses such that laser light pulses of different wavelengths are scanned in different regions of the field of view. For example, pulses of a first wavelength may be placed in the center of the field of view, pulses of a second wavelength may be placed to the left of center of the field of view and pulses of a third wavelength may be placed to the right of center of the field of view.

Modulation of laser light pulses provides channel encoding and interference rejection. Each modulation scheme (corresponding to a set of modulation parameters 169) defines a "channel" in which a LIDAR system may operate. Modulated light pulses are transmitted in that channel, and received reflections in the same channel are processed, while received reflections in other channels may be rejected. In dense LIDAR environments where multiple emitters are transmitting light pulses and receiving light pulse reflections, channel encoding through modulation of light pulses allows any particular LIDAR system to reject received light pulses that originate from other LIDAR systems. Various modulation schemes for channel encoding may be employed without departing from the scope of the present invention. Some examples are described more fully below with reference to later figures.

Figure 2:
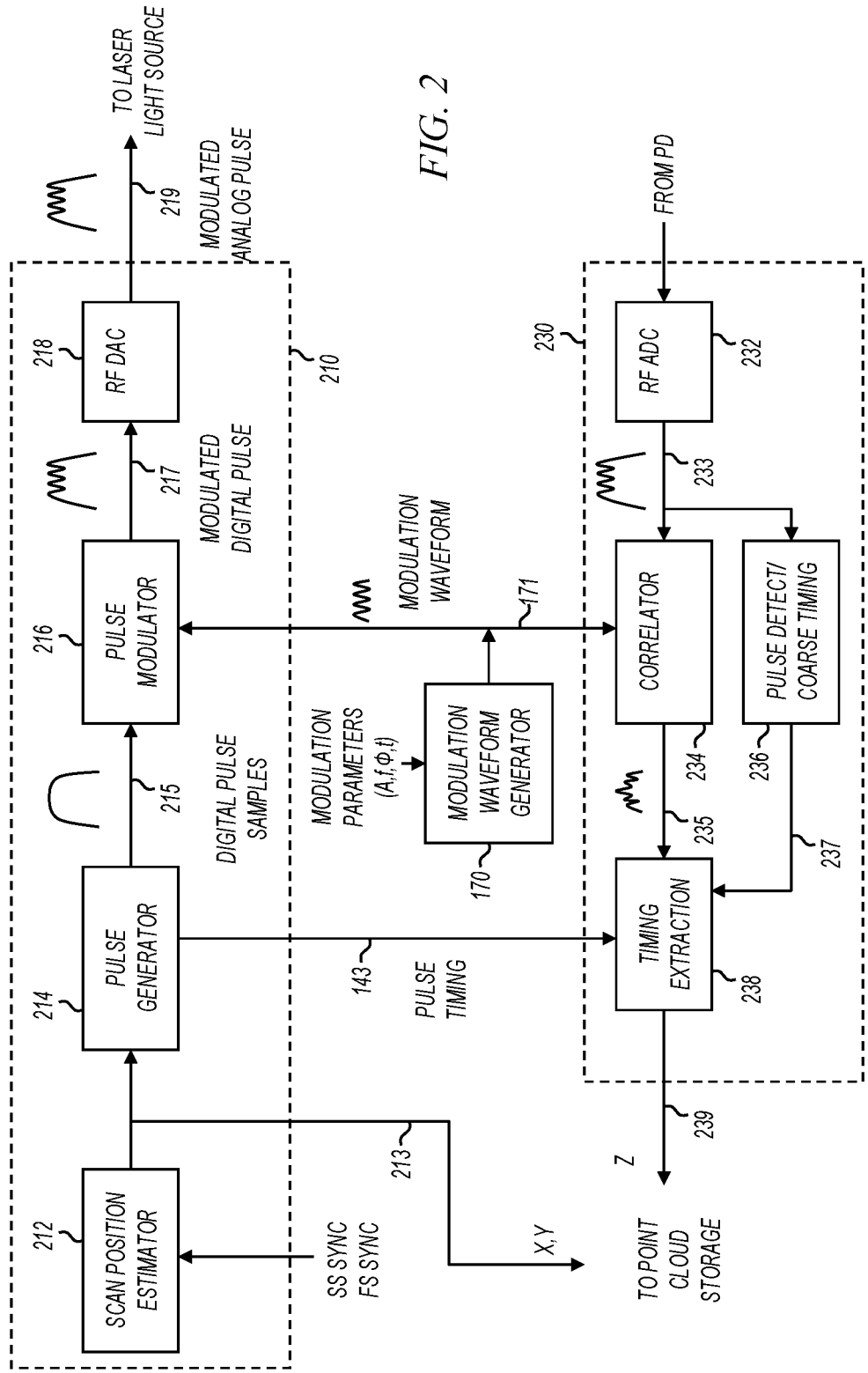
FIG. 2 shows a block diagram of transmit and receive circuits in a LIDAR system in accordance with various embodiments of the present invention.

FIG. 2 shows a block diagram of transmit and receive circuits in a LIDAR system in accordance with various embodiments of the present invention. Transmit circuit 210 is an example transmit circuit that may be used in LIDAR system 100 (FIG. 1) as transmit circuit 140. Transmit circuit 210 includes scan position estimator 212, pulse generator 214, pulse modulator 216, and radio frequency (RF) digital-to-analog converter (DAC) 218.

Receive circuit 230 is an example receive circuit that may be used in LIDAR system 100 (FIG. 1) as receive circuit 184. Receive circuit 230 includes RF analog-to-digital converter (ADC) 232, correlator 234, pulse detection circuit 236, and timing extraction circuit 238.

In operation, scan position estimator 212 estimates the position of mirror 116 from the fast-scan sync (FS SYNC) and slow-scan sync (SS SYNC) signals. In some embodiments, scan position estimator 212 includes one or more phase lock loops to estimate the mirror position. Pulse generator 214 generates pulses at various scan positions which correspond to points within the field of view. In some embodiments, a regular array of pulses are created within the field of view, and in other embodiments, pulses are generated in the field of view in a pattern other than a regular array. Any number or arrangement of pulses may be created within the field of view without departing from the scope of the present invention.

Pulse generator 214 outputs digital pulse samples on node 215 and pulse timing information on node 143. In some embodiments, the digital pulses samples are created at a sample frequency high enough to allow multiple samples per pulse. For example, in some embodiments, digital pulse samples may be created at 500 megasamples per second (MSPS) and pulse widths may be long enough to allow suitable modulation on the pulses.

In some embodiments, pulse timing information on node 143 may be in the form of a single digital signal that is asserted when a pulse is created. In other embodiments, pulse timing information on node 143 may be in the form of a digital word that identifies the time that a pulse is created. Pulse generator 214 may be implemented by digital circuits such as registers, counters, look-up tables, sequential circuits, and the like.

Pulse modulator 216 modulates the pulse received on node 215 with a modulation waveform received on node 171 to produce a modulated digital pulse on node 217. In some embodiments, the modulated pulse on node 217 is in the form of digital samples at the same sample frequency as the digital samples on node 215, and in other embodiments, the modulated pulse on node 217 includes samples at a different sample frequency. In some embodiments, pulse modulator 216 sums the modulation waveform with the digital pulse samples to create the modulated digital pulse samples. In other embodiments, pulse modulator 216 delays the digital pulse samples in response to the modulation waveform, and in still other embodiments, pulse modulator 216 provides on/off keying of the digital pulse in response to the modulation waveform. Any combination of modulation formats and/or processes may be produced or applied by pulse modulator 216 without departing from the scope of the present invention. Pulse modulator 216 may be implemented using suitable digital circuits including registers, adders, delay elements, counters, sequential circuits, and the like.

RF DAC 218 is a digital-to-analog converter that operates at very high frequencies. For example, in some embodiments, RF DAC 218 operates at 500 MSPS, and in other embodiments, RF DAC 218 operates at many gigasamples per second (GSPS). RF DACs are generally known and commercially available.

RF DAC 218 generates a modulated analog pulse on node 219. The modulated analog pulse is encoded with a channel signature as specified by the modulation waveform on node 171. The modulated analog pulse on node 219 is used drive one or more laser light sources in order to create channel encoded laser light pulses that allow the LIDAR system to process received pulses with the same channel signature, and reject received pulses with a different channel signature.

RF analog-to-digital converter (ADC) 232 is an analog-to-digital converter that operates at very high sampling rates. For example, in some embodiments, RF ADC receives and digitizes detected pulses at speeds of 500 MSPS, and in other embodiments, RF ADC 232 operates at many gigasamples per second (GSPS). RF ADCs are generally known and commercially available.

Pulse detection circuit 236 receives digitized samples on node 233 and detects when pulses are present. In some embodiments, pulse detection circuit 236 includes a comparator that compares a magnitude of the digitized samples against a threshold to detect pulses, and in other embodiments, pulse detection circuit 236 includes a constant fraction discriminator (CFD) to detect pulses. Any type of pulse detection may be implemented by pulse detection circuit 236 without departing from the scope of the present invention.

In some embodiments, pulse detection circuit 236 may also provide coarse timing information useful for TOF measurement. For example, the time at which the leading edge of a pulse is detected may be transmitted to timing extraction circuit 238 at 237. Timing extraction circuit 238 may then compare timing information on node 237 with transmit pulse timing on node 143 to measure a TOF of received pulses.

In some embodiments, pulse detection circuit 236 is omitted. For example, some correlator circuit embodiments may perform pulse detection and TOF measurement without a separate detection circuit. These and other embodiments are described more fully below.

Correlator 234 receives digitized samples from RF ADC 232 on node 233. Correlator 234 is an example of a detector capable of detecting received pulses that are modulated with the modulation waveform on node 171. In operation, correlator 234 correlates the digitized pulse samples on node 233 with the modulation waveform on node 171, and provides the result to timing extraction circuit 238. In some embodiments, correlator 234 includes a threshold comparator that compares the correlation result with a threshold to determine whether the received pulse shape sufficiently matches the modulation waveform. Pulses that do not sufficiently match are rejected. Example modulation waveforms and correlation results are described more fully below with reference to later figures.

In some embodiments, correlator 234 also provides timing information to timing extraction circuit 238. For example, correlator 234 may correlate the received pulse with the modulation waveform at multiple time offsets, and the time offset value having the maximum correlation value may then be passed to timing extraction circuit 238. In these embodiments, TOF may be measured using a combination of coarse timing produced by pulse detection circuit 236 and fine timing produced by correlator 234, or TOF may be measured using fine timing produced by correlator 234 alone. These and other embodiments are described more fully below.

Timing extraction circuit 238 receive coarse timing information from pulse detection circuit 236 on node to 37 and receives correlation results from correlator 234 on node 235. In operation, timing extraction circuit 238 combines timing information received on nodes 237 and 235, and compares the results to pulse timing information received on node 143 to determine the time-of-flight of received pulses. For example, coarse timing information that represents the time at which a pulse is detected may be provided by pulse detection circuit 236, and fine timing information that represents the highest correlation timing may be provided by correlator 234. The time-of-flight of received pulses is then provided to point cloud storage as shown at 239.

Figure 3:
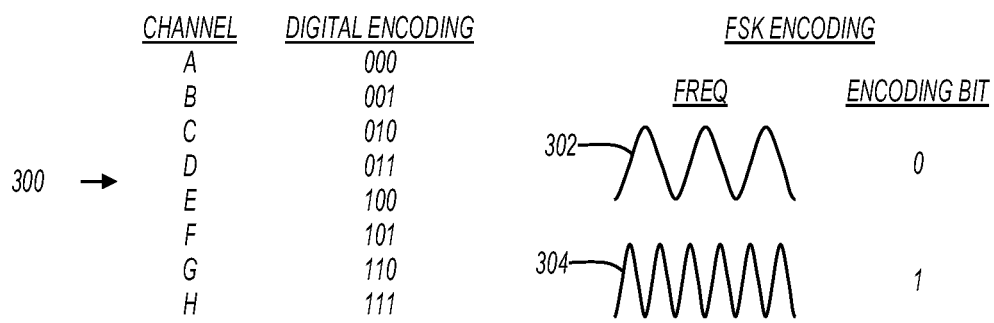
FIG. 3 shows an example channel encoding scheme using frequency shift keying in accordance with various embodiments of the present invention.

FIG. 3 shows an example channel encoding scheme using frequency shift keying in accordance with various embodiments of the present invention. The channel encoding scheme shown in FIG. 3 utilizes frequency shift keying (FSK) encoding. Eight channels A-H are encoded using a three digit binary word. In the example of FIG. 3, a digital "0" is encoded with a first frequency 302, and a digital "1" is encoded with a second frequency 304. Any frequency or combination of frequencies may be utilized for modulation without departing from the scope of the present invention.

Figure 4:
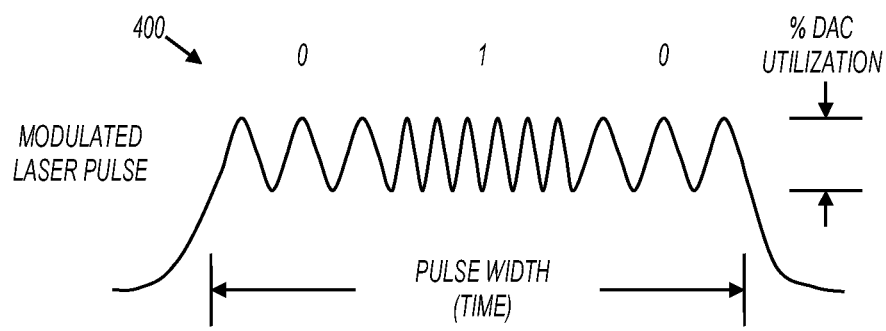
FIG. 4 shows a pulse modulated with a channel signature in accordance with various embodiments of the present invention.

FIG. 4 shows a pulse modulated with a channel signature in accordance with various embodiments of the present invention. Pulse 400 is FSK modulated with the channel signature "010" which corresponds to channel "C" (FIG. 3). Pulse 400 is shown with the channel signature raised, although this is not a limitation of the present invention. For example, a larger percentage of the DAC utilization may be used for modulation if the channel signature is not raised. In some embodiments, this is an implementation decision based on factors such as which form of noise dominates the receiver, and yielding the best signal-to-noise ration (SNR) during channel encoding and recovery.

As the pulse width is increased, either the confidence interval on channel separation can be increased, or additional independent channels can be created by increasing the symbol order. An increase in pulse width also yields additional edges for correlation, increasing computational requirements, but improving extracted timing accuracy. Further, the pulse width may be balanced against the pulse repetition interval and the allowable duty cycle of the laser light source.

FIG. 5 shows detection of a pulse modulated with a channel signature in accordance with various embodiments of the present invention. The amplitude waveform 500 represents an FSK modulated LIDAR pulse transmitted in channel C with a channel signature "010." Amplitude waveform 510 represents a received reflected pulse also having an FSK modulated channel signature "010." For example, amplitude waveform 510 may be present on node 233 (FIG. 2) when a pulse in channel C is received. Modulation waveform 502 represents a modulation waveform used to modulate transmit pulses and detect received pulses with the FSK modulated channel signature "010." For example, modulation waveform 502 may be present on node 171 (FIG. 2) when pulses in channel C are transmitted.

Correlation waveform 520 is an example result when correlating modulation waveform 502 with the received amplitude waveform 510. Because both waveforms represent the same channel signature, the correlation waveform 520 is symmetric with an identifiable peak near the center. In some embodiments, coarse timing is detected at the leading edge of a pulse, and fine timing information is extracted using the correlation result as shown in FIG. 5. In other embodiments, only the fine timing information is used to determine TOF.

FIG. 6 shows rejection of a pulse modulated with a channel signature in accordance with various embodiments of the present invention. As shown in FIG. 6, the modulation waveform 502 represents FSK modulation for channel C, but the received pulse has an amplitude waveform 610 that corresponds to a different FSK channel. Amplitude waveform 610 is encoded with a channel signature that corresponds to "001" or channel B (FIG. 3). When amplitude waveform 620 is correlated with modulation waveform 502, correlation waveform 620 results. As can be seen in FIG. 6, correlation waveform 620 lacks the symmetry of characteristic peak of correlation waveform 520 (FIG. 5). In response to this correlation result, the received pulse may be rejected.

As shown in FIGS. 3-6, a correlator may be used to detect modulation on pulses as well as determine timing of received pulses. When correlation values are above a threshold, a pulse may be accepted, and when correlation values are not above a threshold, a pulse may be rejected. In this manner, channel signatures corresponding to LIDAR pulse channel encoding maybe used to reject received reflected pulses that were not transmitted by the same LIDAR system.

Detection and rejection by correlation is but an example. Any type of modulation/demodulation or detection may be employed to channel encode LIDAR pulses without departing from the scope of the present invention. For example, using knowledge of FSK frequency content, an efficient correlation method may be used to subdivide the pulse waveform at symbol boundaries and compute against their Fourier series equivalent frequencies. The resultant amplitudes are then summed for evaluation against a correlation threshold (signal pulse detection on a given channel) and their phases are averaged to provide a sub-clock time delay estimate to provide a fine timing estimate for TOF determination.

Figure 7:
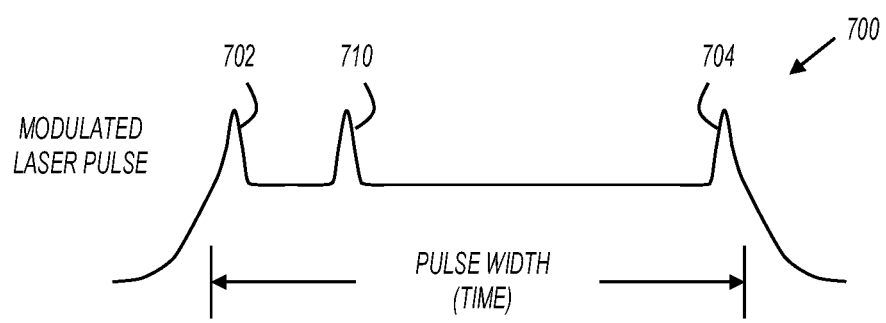
FIGS. 7 and 8 show pulses modulated with channel signatures in accordance with various embodiments of the present invention.
Figure 8:
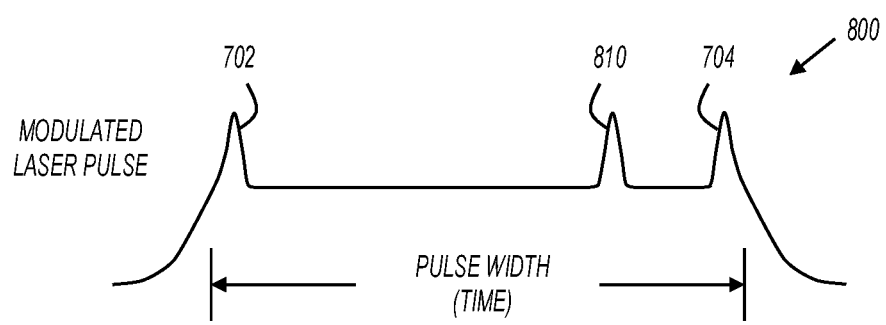

FIGS. 7 and 8 show pulses modulated with channel signatures in accordance with various embodiments of the present invention. The channel signatures in FIGS. 7 and 8 encode channel information using the time placement of narrower pulses within the pulse width time. For example, pulse 700 (FIG. 7) and pulse 800 (FIG. 8) both have starting marker 702 and ending marker 704 to mark the pulse boundaries. Pulse 700 has a channel signature that includes narrow pulse 710 and pulse 800 has a channel signature that includes narrow pulse 810. The time placement of pulses 710 and 810 may be used to designate a channel. For example, seven different time slots may be defined within the entire pulse width, yielding eight different channels (one channel with no narrow pulse, and one additional channel for each time slot). Also for example, narrow pulse combinations may be included to increase the number of available channels.

In some embodiments, the channel signatures represented by FIGS. 7 and 8 may be detected using a correlator as described above. In other embodiments, the channel signatures represented by FIGS. 7 and 8 may be detected using time measurements of the narrow pulses within the modulated pulse. Any suitable detection mechanism may be employed without departing from the scope of the present invention.

Figure 9:
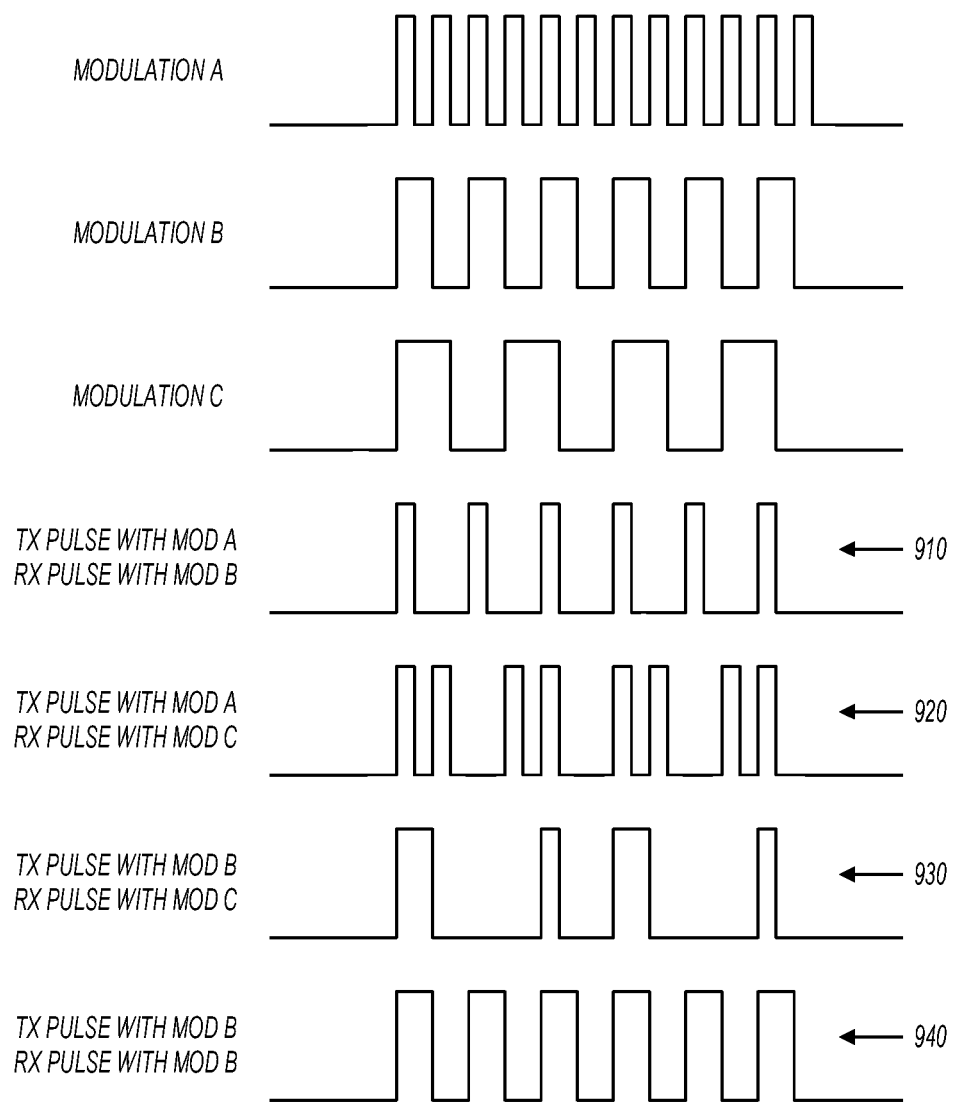
FIG. 9 shows an example channel encoding scheme using frequency modulation in accordance with various embodiments of the present invention.

FIG. 9 shows an example channel encoding scheme using frequency modulation in accordance with various embodiments of the present invention. FIG. 9 shows three different channel signatures, each including a single frequency that is modulated on the entire pulse. Modulation A is at a first frequency, modulation B is at a second frequency, and modulation C is at a third frequency. Any number of channel signatures may be employed by using additional channel signatures at different frequencies.

The channel encoding scheme shown in FIG. 9 is compatible with system architectures that include narrow pulse comparators and time-to-digital converters that utilize a superheterodyne approach for channel identification. In this scheme, each pulse is encoded with a single modulation frequency equivalent to the RF carrier. On the receive side, the pulse is mixed with this carrier frequency again and the resultant frequency content is processed and compared to identify whether the pulse originated from this transmitter or whether it was from another channel. The presence of beat frequencies and non-50% duty cycle content indicates an interference signal. For example, the non-50% waveforms shown at 910, 920, and 930 correspond to a mismatch between transmit and receive channels, and the 50% duty cycle waveform shown at 940 corresponds to a match between transmit and receive channels.

Figure 10:
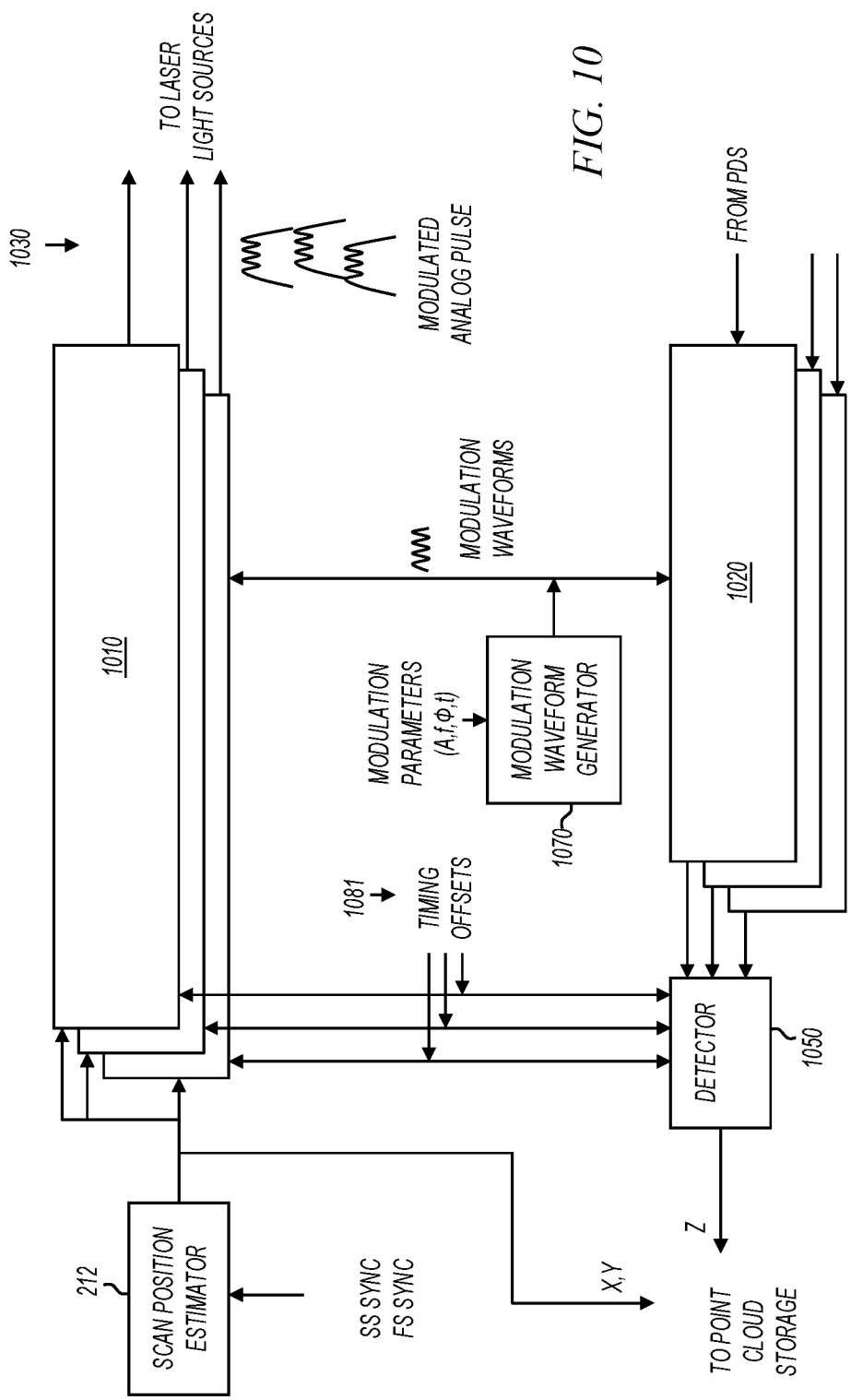
FIG. 10 shows a block diagram of multiple transmit and receive circuits in a LIDAR system in accordance with various embodiments of the present invention.

FIG. 10 shows a block diagram of multiple transmit and receive circuits in a LIDAR system in accordance with various embodiments of the present invention. The example of FIG. 10 is similar to the example of FIG. 2 with the exception that multiple transmit circuits 1010 and multiple receive circuits 1020 are included in FIG. 10. Each of transmit circuits 1010 includes a pulse generator, pulse modulator, and RF DAC as shown in FIG. 2, and each receive circuits 1020 includes an RF ADC, detection circuits, and in some embodiments, timing circuits as shown in FIG. 2.

Multiple transmit and receive circuits allow laser light pulses of different wavelengths to be modulated in parallel. For example, in embodiments represented by FIG. 10, a channel signature may include modulation waveforms for multiple laser light pulses to be transmitted simultaneously or close in time. This channel signature is then detected by the combination of the multiple receive circuits 1020 and detection circuit 1050.

In operation, modulation waveform generator 1070 produces modulation waveforms according to the provided modulation parameters. In some embodiments, one modulation waveform is produced for each transmit/receive circuit pair. The modulation waveforms are provided to transmit circuits 1010 which then produce pulses based on scan positions provided by scan position estimator 212, and modulate those pulses according to the modulation waveforms provided by modulation waveform generator 1070. In addition, timing offset information 1081 is provided to the transmit circuits 1010, and transmit circuits 1010 produce the modulated pulses at different times as specified by the timing offset information 1081. The resultant modulated analog pulses are then provided to laser light pulses at 1030.

The resultant modulated analog pulses may have any modulation imposed thereon, and may have any modulation and/or timing relationship relative to each other. For example, in some embodiments, each of the modulated analog pulses are modulated with the same waveform, and in other embodiments, each of the modulated analog pulses are modulated with different waveforms. Further, the modulated analog pulses may be time-aligned, or may have time offsets. The combination of modulation waveforms imposed on the pulses and the time relationships between the pulses form a channel signature that when detected by the receive circuits allows the LIDAR system to accept pulses in a channel identified by the channel signature, and reject pulses not identified by the channel signature.

Each of receive circuits 1020 receives digitized samples that represent the amplitude of received light at different wavelengths. Each of receive circuits 1020 operates as described with reference to FIG. 2 to detect received reflected modulated light pulses at different wavelengths. Each of receive circuits 1020 provides detector circuit 1050 with a wavelength specific detection result and TOF information that is determined as described above with reference to FIG. 2. Detector 1050 then compares the received TOF information with the timing offset information 1081 to determine if the received pulses have the same timing offsets as the transmitted pulses. If so, the TOF information is provided to the point cloud storage. Detector circuit 1050 may be implemented using any suitable components. For example, in some embodiments, detector circuit 1050 is implemented with digital components such as registers, adders, comparators, and the like.

Figure 11:
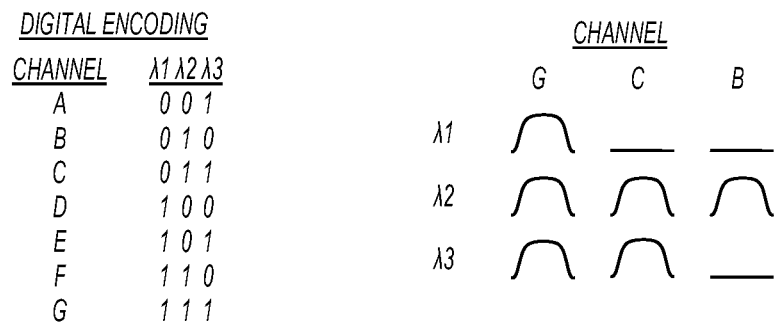
FIG. 11 shows an example channel encoding scheme using on/off keying in accordance with various embodiments of the present invention.

FIG. 11 shows an example channel encoding scheme using on/off keying in accordance with various embodiments of the present invention. The example of FIG. 11 uses three laser light sources having wavelengths $\lambda 1$, $\lambda 2$, and $\lambda 3$, however any number laser light sources and different wavelengths may be used without departing from the scope of the present invention. By encoding the on/off state of the multiple laser light pulses, three light sources yields seven unique encoded states (not including the all zero state). These seven states are shown in FIG. 11 as channels A-G. The on/off pulse states of the three laser light sources are also shown for channels G, C, and B.

The number of channels may be increased by combining the number of laser light sources at different wavelengths or with additional modulation on pulses as described above. The number of possible channels increases exponentially with the number of different modulation schemes on each pulse. In the channel encoding scheme represented by FIG. 11, the on/off state of each laser light source (and any other modulation on the pulses) forms the channel signature.

Figure 12:
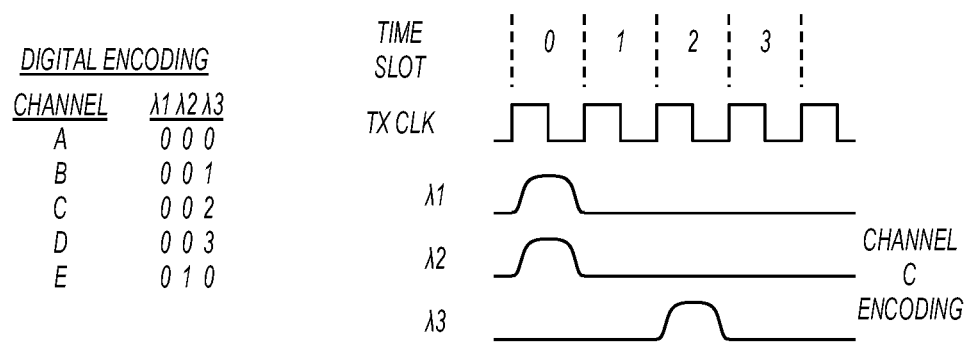
FIG. 12 shows an example channel encoding scheme using time offsets in accordance with various embodiments of the present invention.

FIG. 12 shows an example channel encoding scheme using time offsets in accordance with various embodiments of the present invention. The example of FIG. 12 uses the timing of pulses from three laser light sources having wavelengths $\lambda 1$, $\lambda 2$, and $\lambda 3$ to encode channel information. For example, time slots may be defined, and pulses of various wavelengths may be transmitted at different times to create different channel signatures that define different channels. FIG. 12 shows and example channel signature for channel C in which laser light pulses of wavelengths $\lambda 1$ and $\lambda 2$ are transmitted in time slot 0 and a laser light pulse of wavelength $\lambda 3$ is transmitted in time slot 2. Although FIG. 12 shows three laser light sources of different wavelengths, any number laser light sources and different wavelengths may be used without departing from the scope of the present invention. The number of possible channel signatures may be increased by combining the number of laser light sources at different wavelengths with additional modulation on pulses as described above.

In addition to providing a means for active interference rejection, leveraging multiple wavelengths and pulse signatures for channelization also provides redundant/repeated ToF return data which can be processed using standard multi-shot methods to extract enhanced timing information to improve SNR and extend range.

Figure 13:
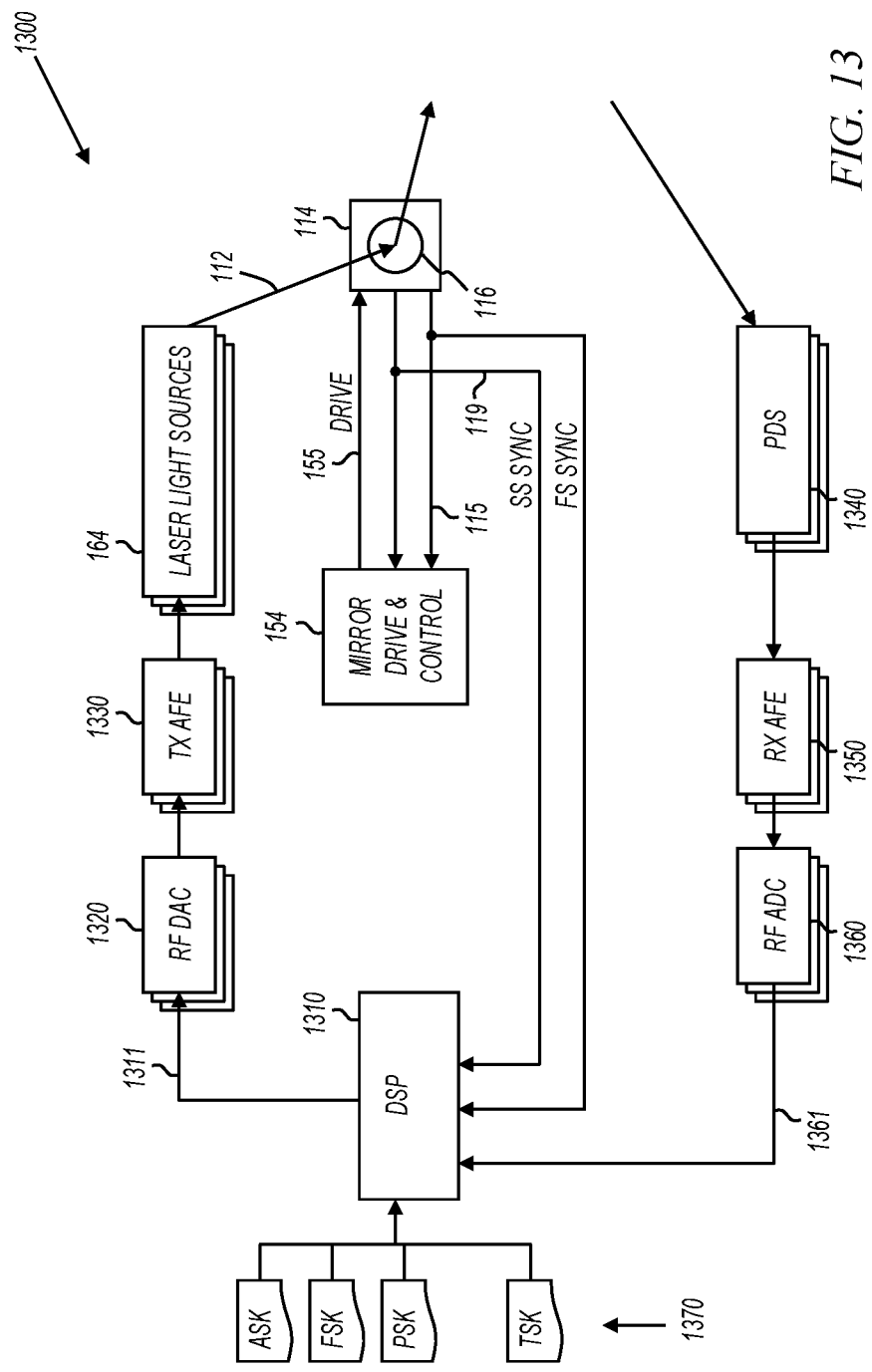
FIG. 13 shows a block diagram of a LIDAR system in accordance with various embodiments of the present invention.

FIG. 13 shows a block diagram of a LIDAR system in accordance with various embodiments of the present invention. LIDAR system 1300 includes RF DACs 1320, transmit analog front ends (TX AFE) 1330, laser light sources 164, photodetectors (PD) 1340, receive analog front ends (RX AFE) 1350, RF ADCs 1360, digital signal processor 1310, storage devices 1370, mirror drive and control circuit 154, and scanning platform 114.

LIDAR system 1300 differs from LIDAR systems of previous figures in that most if not all of the digital processing is performed by a digital signal processor rather than in discrete digital components. For example, DSP 130 generates digital samples representing modulated pulses according to channel signatures defined in one or more of storage devices 1370, and provides those digital samples to one or more of RF DACs 1320. RF DACs 1320 convert the digital samples to modulated analog pulses, which are conditioned by the TX AFEs 1330, which then in turn drive laser light sources 164. TX AFEs 1330 may be implemented with any suitable components, including for example, filters, amplifiers, and the like.

Reflected modulated pulses are received by PDs 1340, processed by RX AFEs 1350, and then digitized by RF ADCs 1360. The digitized samples of the received reflection of modulated pulses are then provided to DSP 1310 for further processing. In some embodiments, the processing may include pulse detection, coarse timing determination, correlation, fine timing determination, demodulation, and the like. Accordingly, DSP 1310 is able to accept and measure pulses that are in one or more specific channel(s), and reject pulses that are in different channels.

As described above, channel signatures used to define channels may include any type and number of modulated pulses along with multiple laser light wavelengths. DSP 1310 modulates pulses according to a channel signature, and then measures the TOF of received reflections of modulated pulses having the same channel signature.

Storage devices 1370 may be any type of storage device accessible by DSP 1310. For example, storage devices 1370 may be non-transitory memory devices encoded with instructions, that when executed by DSP 1310, result in DSP 1310 modulating pulses, demodulating pulses, accepting some pulses and rejecting others, and determining TOF of accepted pulses. In some embodiments, each of storage devices 1370 may have encoded thereon a set of instructions for mutually exclusive modulation schemes. For example, one may have instructions for amplitude shift keying (ASK), one may have instructions for frequency shift keying (FSK), one may have instructions for phase shift keying, and one may instructions for time shift keying (TSK). In these embodiments, DSP 1310 may be programmed to use any modulation scheme exclusive of the others during operation. In other embodiments, storage devices 1370 may have encoded thereon sets of instructions that combine various modulation schemes. For example, DSP 1370 may be programmed to perform modulation using any combination of ASK, FSK, PSK, TSK, on/off shift keying, multiple wavelengths, and any other modulation parameters.

Figure 14:
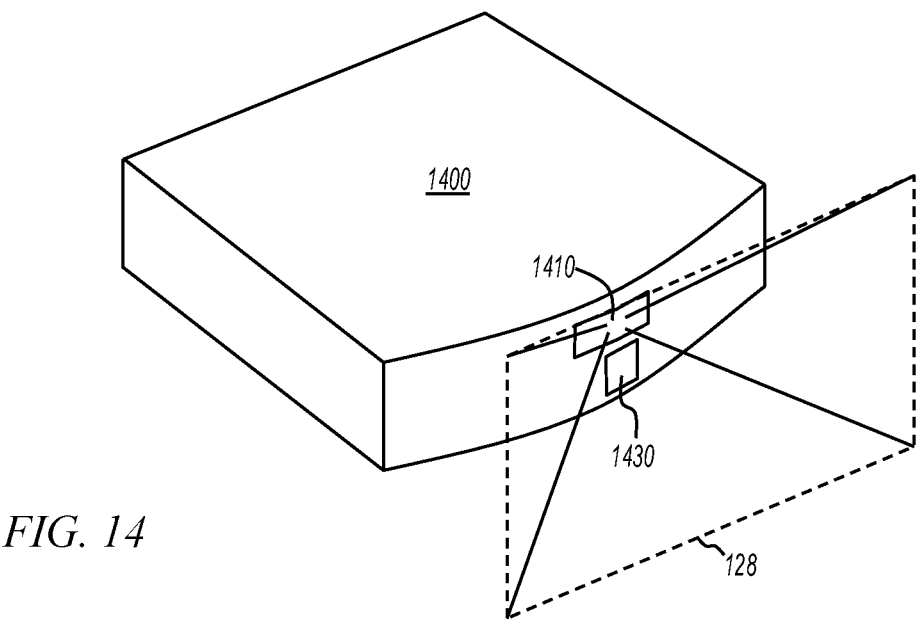
FIG. 14 shows a LIDAR system in accordance with various embodiments of the present invention.

FIG. 14 shows a perspective view of a scanning light detection and ranging system in accordance with various embodiments of the present invention. Scanning light detection and ranging (LIDAR) system 1400 includes a scanner 1410 and light sensing apparatus 1430. LIDAR system 1400 may be any of the LIDAR systems described herein, or may include any combination of components described herein. For example, scanner 1410 may be implemented as scanning device 114, and light sensing apparatus may any of the photodetector embodiments described herein. In operation, LIDAR system 1400 scans modulated laser light pulses in a field of view 128, and light sensing apparatus 1430 is used to detect modulated laser light reflections from points within the field of view 928 to determine the distance (range) to the reflection points.

Figure 15:
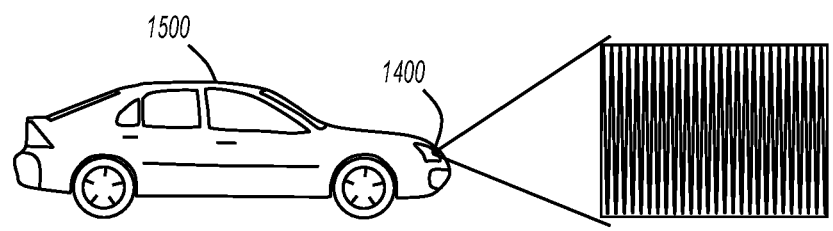
FIG. 15 shows an automotive application of the LIDAR system of FIG. 14 in accordance with various embodiments of the present invention.

FIG. 15 shows an automotive application of the scanning light detection and ranging system of FIG. 14 in accordance with various embodiments of the present invention. As shown in FIG. 15, vehicle 1500 includes LIDAR system 1400 at the front of the vehicle. LIDAR system 1400 may be any LIDAR system that modulates pulses with channel signatures as described herein.

Figure 16:
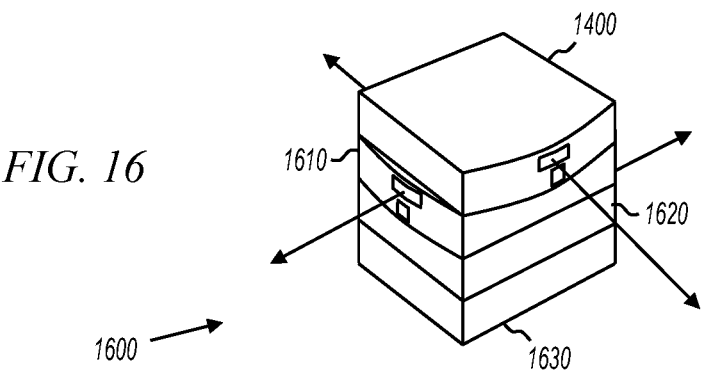
FIG. 16 shows a LIDAR system that includes multiple LIDAR modules in accordance with various embodiments of the present invention.

FIG. 16 shows a light detection and ranging system that includes multiple scanning light detection and ranging modules in accordance with various embodiments of the present invention. LIDAR system 1600 includes four identical scanning LIDAR modules 1400, 1610, 1620, and 1630. Each scanning LIDAR module has horizontal angular extents of substantially 90 degrees, and each if offset by 90 degrees to provide an effective angular extents of 360 degrees.

In some embodiments, fewer than four LIDAR modules are included in LIDAR system 1600. For example, some embodiments include three LIDAR modules, each with angular extents of substantially 120 degrees, and other embodiments include two LIDAR modules, each with angular extents of substantially 180 degrees. Use of multiple LIDAR modules in LIDAR system 1600 allows a depth map that spans 360 degrees of angular extents.

Figure 17:
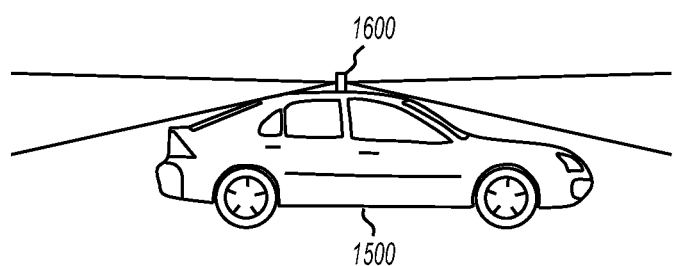
FIG. 17 shows an automotive application of the LIDAR system of FIG. 16 in accordance with various embodiments of the present invention.

FIG. 17 shows an automotive application of the scanning light detection and ranging system of FIG. 16 in accordance with various embodiments of the present invention. As shown in FIG. 17, vehicle 1500 includes LIDAR system 1600 located on the vehicle such that LIDAR system 1600 has an effective angular extents of 360 degrees.

Figure 18:
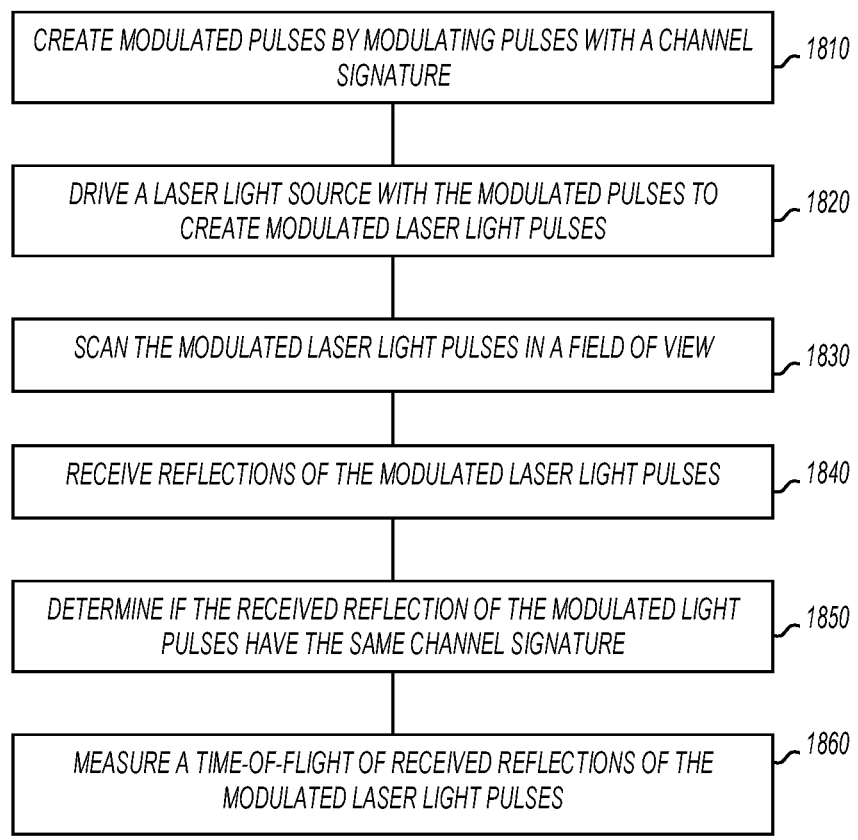
FIG. 18 shows a flow diagram of methods in accordance with various embodiments of the present invention.

FIG. 18 shows a flow diagram of methods in accordance with various embodiments of the present invention. In some embodiments, method 1800, or portions thereof, is performed by a scanning LIDAR system or a scanning LIDAR module. In other embodiments, method 1800 is performed by a series of circuits or an electronic system. Method 1800 is not limited by the particular type of apparatus performing the method. The various actions in method 1800 may be performed in the order presented, or may be performed in a different order. Further, in some embodiments, some actions listed in FIG. 18 are omitted from method 1800.

Method 1800 is shown beginning with block 1810 where modulated pulses are created by modulating pulses with a channel signature. The channel signature may include any type of modulation. For example, the channel signature may include ASK, FSK, PSK, on/off shift keying and/or time offsets of multiple laser light sources, and the like. Further in some embodiments, multiple pulses of different wavelengths are created, each with identical or different modulation characteristics.

In some embodiments, modulated pulses are created by generating digital samples that represent the amplitude and phase of the modulated pulse and then providing the digital samples to a DAC to create analog modulated pulses. For example, a digital signal processor may generate digital samples that represent modulated pulses. Also for example, dedicated digital hardware such as counters, registers, memory devices, and the like may implement a pulse generation circuit and a pulse modulation circuit. The digital samples are then provided to an RF DAC capable of converting the digital samples to an analog waveform at a very high rate. In some embodiment, the modulated pulses are created at points in time that correspond to points on a raster scan in a field of view. For example, the modulated pulses may be created in response to the scan position of a scanning mirror that will scan laser light pulses in the field of view.

At 1820, a laser light source is driven with the modulated pulses to create modulated laser light pulses. In some embodiment, a single laser light source driven with the modulated pulses. In other embodiments, multiple laser light sources are driven with the modulated pulses. For example, in some embodiments, light at different wavelengths is emitted from a plurality of light sources. In some embodiments, each of the laser light sources may be driven by pulses with similar modulation characteristics, and in other embodiments, each of the laser light sources may be driven by pulses with different modulation characteristics. In embodiments that emit laser light pulses of different wavelength, the combination of wavelengths and modulation on pulses of each wavelength make up the channel signature.

At 1830, the modulated laser light pulses are scanned in a field of view. The scanning may be performed by a single mirror or multiple mirrors (FIG. 1) or a non-mirror scanning mechanism.

At 1840, reflections of the modulated laser light pulses are received. In some embodiments, photodetectors detect light and provide analog signals corresponding to the received pulses. In some embodiments, additional analog front end circuits condition the signals. Examples include low noise amplifiers, filters, and the like. In some embodiments, the received reflections include modulated pulses having different wavelengths.

At 1850, a determination is made if the received reflections of modulated laser light pulses have the same channel signature. In some embodiments, this corresponds to correlating received pulses with the channel signature used to modulate the pulses at 1810. In other embodiments, this corresponds to demodulating the pulses and comparing modulation characteristics. In some embodiments, received reflections that do not have the same channel signature are rejected.

At 1860, times-of-flight of the received reflections of modulated laser light pulses are measured. This corresponds to the operation of the various TOF measurement circuits described above.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A light detection and ranging system comprising:
   at least one laser light source to emit laser light pulses;
   at least one pulse generation circuit to create a digital representation of a pulse modulated with a channel signature;
   at least one digital to analog converter coupled to receive the digital representation of the pulse and to provide an analog representation of the pulse to the at least one laser light source; and
   a receive circuit to detect received light pulses, the receive circuit including an analog to digital converter and a correlator to correlate an output of the analog to digital converter with the channel signature, and wherein the receive circuit rejects received light pulses not modulated with the channel signature and measures a time-of-flight of received light pulses that are modulated with the channel signature.

2. The light detection and ranging system of claim 1 further comprising a scanning mirror to scan the laser light pulses in a field of view.

3. The light detection and ranging system of claim 1 wherein the receive circuit determines a peak of highest correlation between the received laser light pulses and the channel signature and wherein the receive circuit measures the time-of-flight of received light pulses using the peak of highest correlation.

4. The light detection and ranging system of claim 1 wherein the receive circuit measures the time-of-flight of received light pulses by determining a peak of highest correlation at an output of the correlator.

5. The light detection and ranging system of claim 1 wherein the channel signature comprises frequency shift keying modulation on the pulse.

6. The light detection and ranging system of claim 1 wherein the at least one laser light source comprises a plurality of laser light sources to emit laser light pulses at different wavelengths.

7. The light detection and ranging system of claim 1 wherein the at least one laser light source comprises a plurality of laser light sources to emit laser light pulses modulated with a channel signature.

8. The light detection and ranging system of claim 1 wherein the at least one laser light source comprises a plurality of laser light sources to emit laser light pulses having time offsets.

9. The light detection and ranging system of claim 1 wherein the at least one laser light source comprises a plurality of laser light sources to emit laser light pulses using on/off keying.

10. A light detection and ranging system comprising:
    a plurality of laser light sources to emit laser light pulses;
    a pulse generation circuit to drive the plurality of laser light sources, the pulse generation circuit configured to modulate the laser light pulses from the plurality of laser light sources with a plurality of different channel signatures that represent different channels;
    a receive circuit that receives reflections of the laser light pulses with the plurality of different channel signatures and identifies a channel to which the reflections of the pulses belong based on the plurality of different channel signatures, and wherein the receive circuit rejects received reflections of laser light pulses not modulated with one of the plurality of different channel signatures; and
    time-of-flight measurement circuit to measure times of flight of the reflections of the laser light pulses with the plurality of different channel signatures.

11. The light detection and ranging system of claim 10 wherein the pulse generation circuit modulates the laser light pulses from the plurality of laser light sources with a plurality of different channel signatures using on/off keying of pulses.

12. The light detection and ranging system of claim 10 wherein the pulse generation circuit modulates the laser light pulses from the plurality of laser light sources with a plurality of different channel signatures using time offsets between pulses.

13. The light detection and ranging system of claim 10 wherein the time-of-flight measurement circuit determines peaks of highest correlation between the reflections of the laser light pulses and one of the plurality of channel signatures and wherein the time-of-flight measurement circuit measures times of flight of the reflections of the laser light pulses using the peak of highest correlation.

14. The light detection and ranging system of claim 10 further comprising a scanning mirror to scan the laser light pulses into a field of view.

15. A method comprising:
    creating a modulated pulse by modulating a pulse with a channel signature;
    driving a laser light source with the modulated pulse to create modulated laser light pulses;
    receiving reflections of the modulated laser light pulses;
    determining if the received reflections of the modulated laser light pulses are modulated with the channel signature; and
    measuring a time-of-flight of received reflections of the modulated laser light pulses that are modulated with the channel signature while rejecting received reflections of the modulated laser light pulses that are not modulated with the channel signature.

16. The method of claim 15 wherein measuring a time-of-flight of received reflections of the modulated laser light pulses that are modulated with the channel signature comprises:
    determining a peak of highest correlation between the received reflections of the modulated laser light measuring the time-of-flight of the received reflections using the peak of highest correlation.

17. The method of claim 16 further comprising not measuring the time-of-flight of rejected received reflections of the modulated laser light pulses that are not modulated with the channel signature.

18. The method of claim 15 wherein determining if the received reflections of the modulated laser light pulses are modulated with the channel signature comprises correlating the received reflections with the channel signature.

19. The method of claim 18 wherein measuring the time-of-flight comprises measuring fine timing from the correlation of the received reflections with the channel signature.

20. The method of claim 19 wherein driving a plurality of laser light sources comprises driving the plurality of laser light sources with modulated pulses having time offsets.

21. The method of claim 15 further comprising:
    creating a plurality of modulated pulses;
    driving a plurality of laser light sources; and
    measuring times of flight of reflections of the plurality of laser light pulses.

* * * * *